United States Patent [19]  [11] 4,182,778
Hall et al.  [45] Jan. 8, 1980

[54] ENCAPSULATION OF VITAMIN AND MINERAL NUTRIENTS

[75] Inventors: Harlan S. Hall, Black Earth; Ralph E. Pondell, Madison, both of Wis.

[73] Assignee: General Foods Corporation, White Plains, N.Y.

[21] Appl. No.: 906,541

[22] Filed: May 17, 1978

[51] Int. Cl.$^2$ .............................................. A23L 1/30
[52] U.S. Cl. ....................................... 426/72; 426/74; 426/97; 426/303
[58] Field of Search ..................... 426/72, 97, 590, 74, 426/303, 285

[56] References Cited

U.S. PATENT DOCUMENTS

| | | | |
|---|---|---|---|
| 2,540,302 | 2/1951 | Stecher | 426/72 |
| 2,912,332 | 11/1959 | Young et al. | 426/72 |
| 2,945,039 | 7/1960 | Salant | 426/72 |
| 3,468,667 | 9/1969 | Chandler et al. | 426/97 |
| 3,821,422 | 6/1974 | Morse | 426/72 |

*Primary Examiner*—Jeanette M. Hunter
*Attorney, Agent, or Firm*—Daniel J. Donovan; Richard Kornutik

[57] ABSTRACT

This invention relates to the encapsulation of vitamin and mineral nutrients in a mixture of non-toxic solid cellulose derivative and a non-toxic solid hydroxylated lipid material by fluidizing the nutrient in a gaseous stream and contacting the nutrient with finely atomized droplets of coating solution whose solvent is operative to dissolve the ingredients of the mixture. The gas stream volatilizes and removes the solvent. The fluidization and solution contact are repeated through a number of sequential coatings which aggregate separately coated nutrient particles and encapsulate the aggregate with a continuous substantially odor inhibiting coating matrix.

9 Claims, 2 Drawing Figures

ENCAPSULATION OF VITAMIN AND MINERAL NUTRIENTS

BACKGROUND OF THE INVENTION

The art of adding agents to foodstuffs has advanced in many directions calling for the encapsulation of organoleptically offensive nutrients. This invention relates to a method whereby a number of nutrients, particularly thiamine, can be effectively fixed in compatible encapsulating mediums for incorporation in various food systems, especially aqueous food systems.

Thiamine has an extremely strong characteristic yeasty, fishy odor which has greatly limited its use in food systems such as dry beverage mixes whereas the art of encapsulating medicaments for pharmaceutical preparations tolerate some trace of thiamine character. The formulation of a comestible has a much more demanding threshold tolerance to the organoleptic impact of offensive nutrients such as thiamine. The art has long sought and failed to provide a means whereby thiamine can be commercially combined in a food system without contributing its characteristic odors and taste. The need for stabilization of thiamine in a fixation which substantially completely inhibits sensory perception of the thiamine in both aqueous and non-aqueous food systems presents a challenge which available art practices have not heretofore been satisfactorily met.

A key limitation is the ability that provides stability against thiamine odors in both aqueous as well as dry food systems. Thiamine degradation odors are particularly objectionable in certain food applications such as cereals and beverages where the consumer senses either flavorful cereal notes or in the case of beverage products fruit or like flavor notes which are both aromatic and flavor perceptible. In such products it is important to have a flavor characteristic wherein there is a substantially neutral presence of thiamine or any thiamine degradation odors. Additionally, such thiamine fixations should be compatible with other nutrients that may desirably be mixed in the food system such as ascorbic acid or mineral salts. The effective partitioning of the thiamine fixations so that in the beverage state or other reconstituted aqueous medium the thiamine is not available for any organoleptic contribution or reaction with such other nutrients is a desired characteristic of the thiamine fixation.

To be useful the coating applied to thiamine must be of such a nature and an amount that it permits the thiamine to be bio-available after ingestion. Additionally, regulatory involvement in the area of nutritional fortification of foods also requires that any coating medium be substantially free of questionable residues employed to implement such coating materials. Thus the coating agents, as well as the solvents employed to facilitate distribution of the coating agent, should preferably be on the GRAS (generally recognized as safe by the Food & Drug Administration) list.

Prior art attempts have met with limited success regarding techniques which would produce an acceptable thiamine coated product. One example is disclosed in Food Additive Petition No. 4A3020. According to the disclosure, thiamine was coated with a combination of ethyl cellulose and a blend of distilled glyceryl monostearate and propylene glycol monostearate together with hydrogenated vegetable oil. A combination of methylene chloride and ethanol was used to dissolve the coating materials. The dissolved coating materials were contacted with the thiamine crystals and dried utilizing a fluidized bed coating apparatus. The microencapsulated thiamine was intended for use in dry beverage mixes, dry breakfast cereals, dry pudding mixes and dry gelatin mixes. The limitation of that process, however, was that to achieve adequate protection of the thiamine the coating material had to comprise 80% of the total weight of the encapsulated product. Additionally, this high proportion of coating required process times typically in excess of 50 hours.

The utilization of ethyl cellulose in another prior art attempt to encapsulate thiamine is disclosed in U.S. Pat. No. 3,821,422 to Morse. The thiamine was microencapsulated with a coating of ethyl cellulose dissolved in cyclohexane and hexane. The product was to be used in the preparation of cake mixes. Accordingly, the thiamine was protected only in neutral or alkaline conditions and was released as acid in systems such as gastric fluid.

Other prior art attempts relate to the encapsulation of a variety of foods and particularly pharmaceutical compositions. For example, U.S. Pat. No. 2,921,883 to Reese relates to the use of a coating material for prolonging the release of medicaments in the gastrointestinal tract. The material is coated in the form of a pellet and is typically 500 microns in diameter. According to the examples, the medicaments were placed in a pan and then covered with a lipid/cellulose derivative solution and subsequently dried. Typical coating levels disclosed are 2 to 15% of coating by weight of the total composition. Such a system is unsuitable for use in beverages since the final product size is too large.

Accordingly, it becomes desirable to provide an alternative coated thiamine product and a method for obtaining it wherein the coated product has a broad range of uses including stability in dry beverage mixes and the beverage derived from those mixes. In the case of dry beverage mixes and the like, the fixed thiamine should be capable of withstanding extended storage conditions wherein the temperature exceeds 100° F. The coating should be stable at such elevated storage temperatures so that the encapsulated product retains its functionality and does not result in undesirable organoleptic factors in the reconstituted product. Additionally, the thiamine fixation should be such that the coated form has a physical strength sufficient to permit the encapsulated product to withstand the abrasion or attrition which can be enduced during blending and storage with other constituents of the product.

Regarding a final product which is a beverage or aqueous foodstuff, especially those with a pH of below about 4.5, it is desirable that the thiamine in the final product remain stable for at least 25 hours and preferably at least 48 hours without contributing offensive thiamine odors.

SUMMARY OF THE INVENTION

It is an object of this invention to provide for the encapsulation or coating of nutrients to render them stable and/or inert in food systems. Particularly, it is an object of this invention to provide a coating for thiamine which is devoid of the characteristic taste and odor of thiamine for extended periods of time in food systems. Another object of this invention is to provide an encapsulated thiamine which is ultimately bio-available on an equivalency basis with encapsulated thiamine. Still another object of this invention is to provide a coating which is malleable as opposed to brittle and which will not degrade when blended with other dry mix ingredients. Still another object of this invention is to provide a thiamine coating which will not interact with any other ingredients in a dry mix.

These and other objectives are accomplished according to the present invention which relates to a method encapsulating nutrients having properties incompatible with food systems by fluidizing at least one nutrient, particularly powderous thiamine, in a gaseous stream (controlled air suspension) and contacting the suspended nutrient with a solution comprised of ethyl cellulose, distilled propylene glycol mono-ester, acetylated mono-glycerides and ethanol. The fluidization is repeated through a number of sequential coatings while the ethanol is continuously volatilized in the gas stream to thereby aggregate separately coated nutrient particles and encapsulate the aggregate with a continuous material wherein the ultimate agglomerate is devoid of solvent. The solution of coating materials used in the invention is essentially applied to individual nutrient particles which are discretely encapsulated. The solvent residues are removed substantially whereupon the thiamine is recoated so as to be aggregated as well as coated in a matrix wherein the nutrient particles are not proximate to the surface of the agglomerate. Thus, the nutrient particles are functionally partitioned within a substantial continuous envelope. This envelope is essentially non-water soluble and has a thickness sufficient to reduce or minimize water permeability for the intended length of time where the functionality in both aqueous and dry mediums is required.

BRIEF DESCRIPTION OF THE DRAWINGS

Referring to the accompanying drawing.

DETAILED DESCRIPTION OF THE INVENTION

As disclosed in the article "Microencapsulation in the Food Industry—CRC Critical Review in Food Technology—July 1971" microencapsulation in the food industry may involve the techniques of spray drying, spraying on a hydrophobic powder, spraying on a moving oil surface, spray freezing, spray dehydration, spray chilling, aqueous phase separation (coacervation), organic phase separation, as well as spray coating in a fluidized bed. Regarding coating by means of a fluidized bed, the article discloses that art workers heretofore generally have been unsuccessful in coating particles with irregular surfaces and especially fibrous material or materials with long, needle-like crystals. Particle sizes below 200 microns also are difficult to coat. Additionally, irregular shaped pieces could only be coated with a thin film resulting in correspondingly low encapsulation protection. It will be apparent that the method of this invention which relates to the encapsulation of nutrients, especially thiamine, will meet all of the objectives described above and also overcome the limitations of particular processing techniques related to fluidized bed encapsulation encountered by prior art workers.

Figure 1:
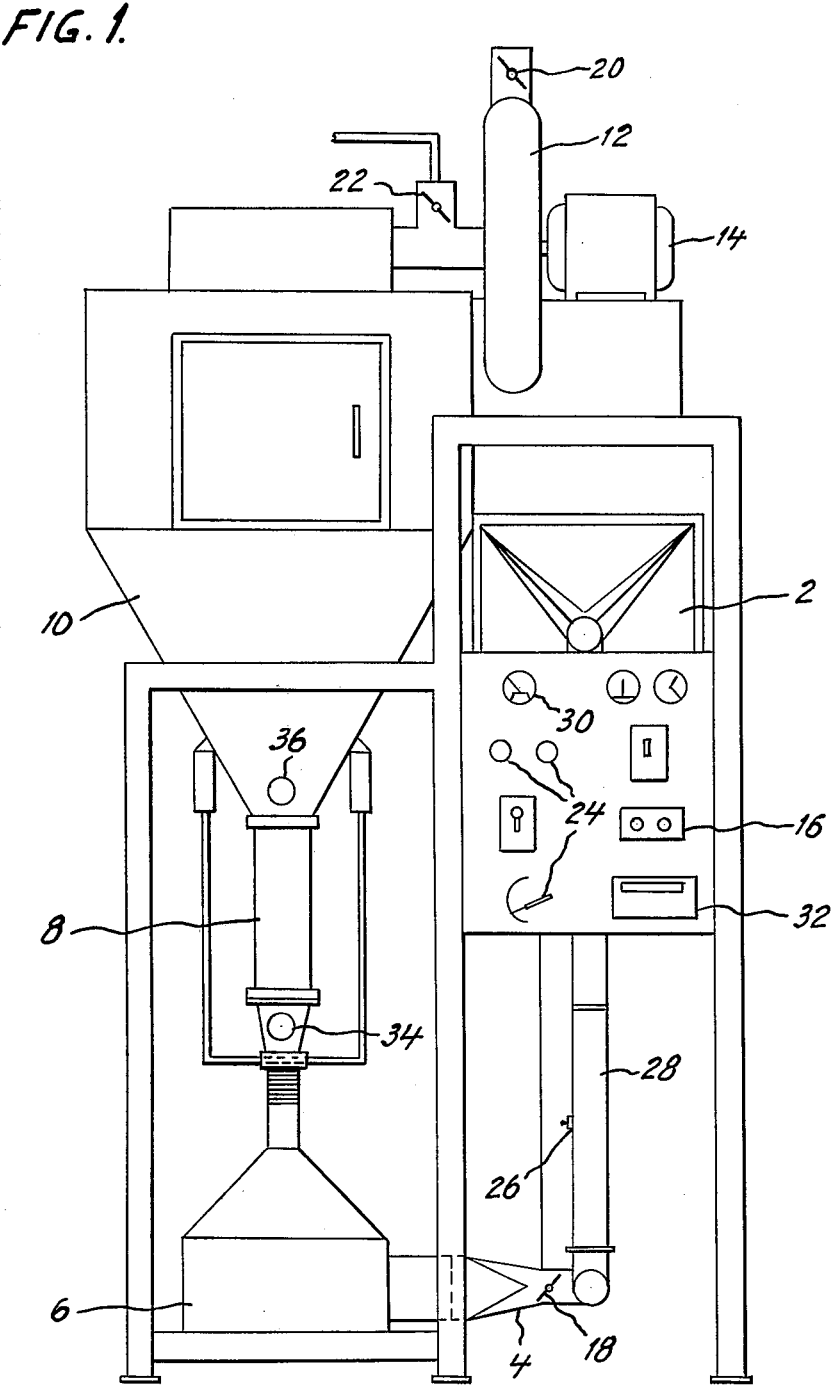
FIG. 1 is a schematic elevational view of a coating apparatus used in carrying out the process.

FIG. 1 shows an apparatus of the type utilized in carrying out the method of this invention and such apparatus is generally disclosed in U.S. Pat. No. 3,196,827 to Wurster. Such a fluidized bed coating process may in one respect be considered a modified spray drying process; that is, a liquid solvent is volatilized and removed by a gaseous stream. In the fluidized bed, however, the material to be encapsulated is fluidized or suspended in a stream of gas (usually air). The suspended material is coated by spraying upon the surface of the particles either a solution of wall material or molten wall material. The Wurster process is designed to provide conditioned air which fluidizes the solution of coating agents with the material to be coated and induces recirculation. The apparatus is also equipped with means to effect solvent removal.

The particular apparatus useful in the practice of this invention will now be described in detail.

The system comprises inlet air filter 2, a heat source 4, an air distribution chamber 6, a coating chamber 8, an expansion chamber 10, and a blower 12 to draw air through the system.

Figure 2:
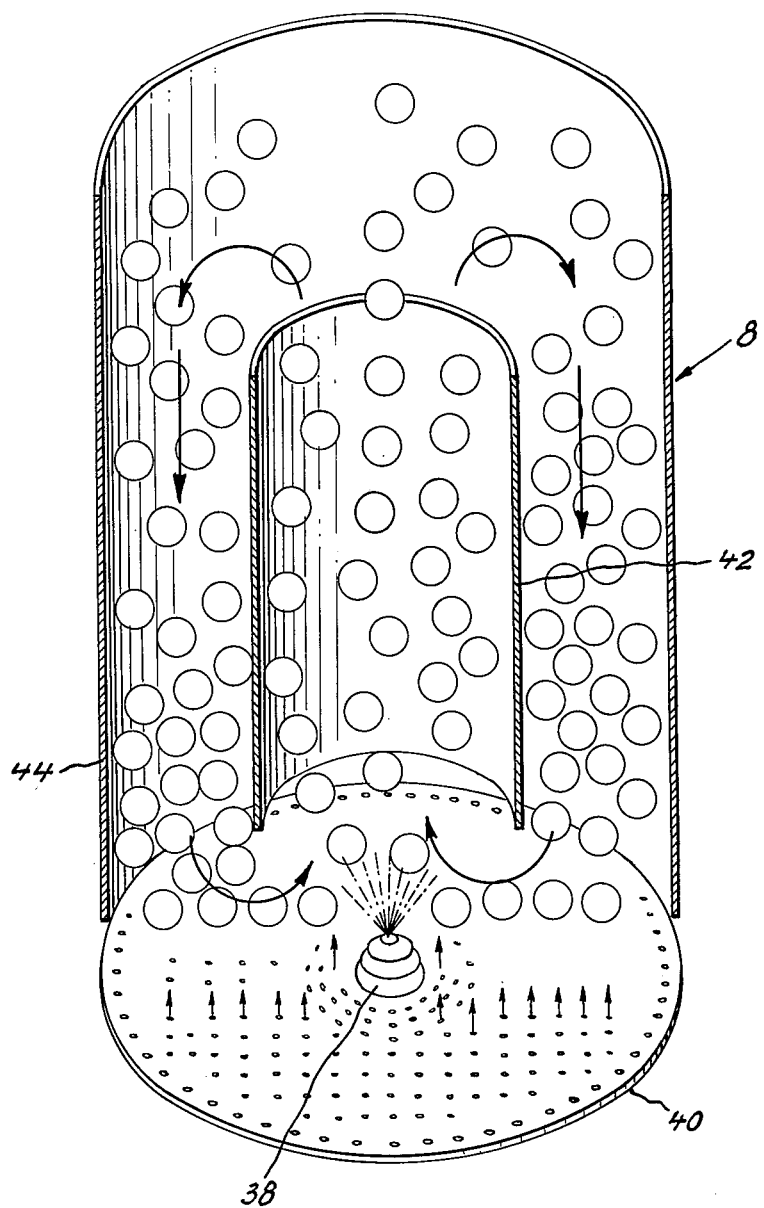
FIG. 2 is a detailed isometric view, partially in section, of the coating chamber of the apparatus of FIG. 1.

Blower 12 is driven by motor 14 controlled by starter 16 located on a control panel generally labeled as such, though the circuitry is not shown. The air volume is controlled by manipulating singly or in combination: a damper on the air inlet duct 18, a damper on the blower outlet 20, and a bypass valve 22 located between the expansion chamber and the blower. These valves and dampers are adjusted by controls 24 on the instrument panel though the circuitry is not shown. The air flow is monitored by inserting a pitot tube 26, annubar or other suitable device into the air inlet duct 28 and connecting to a gauge 30 on the instrument panel. Temperature within the unit is maintained by a steam heat exchanger generally shown as 4 or equivalent electrical element or other heat source linked to a proportional controller 32 on the control panel. Temperature can be read by thermometers 34, 36 or on the instrument panel using remote sensors not shown. Air distribution chamber 6 is designed to provide uniform air distribution to the base of the coating chamber 8. The chamber (FIG. 2) will be seen to comprise a nozzle assembly 38 for atomizing coating solution as shown, an air distribution plate 40, which controls and directs the air pattern, and a cylindrical partition 42. Partition 42 generally divides the coating chamber into upward and downward flowing sections, the upward flowing section being the actual coating zone.

Above the coating chamber (FIG. 1), expansion chamber 10 is of greater diameter than that of the coating chamber whereby linear air velocity is decreased allowing particles that are coated by solution to settle out of the air stream defined by partition 42 and descend in the zone intermediate of said partition and outside of the coating chamber. Expansion chamber 10 is fitted with a suitable filter 44 or other means to remove fines and facilitate the solvent removal from the air stream.

Hydraulic or pneumatic nozzle 38 is shown in the center of the air distribution plate 40 which, by means of the disposition and size of the perforations it contains, controls and directs air flow and consequent movement of the materials to be coated within the chamber. As each particle passes through the coating zone defined by the partition 42, it is carried upwardly on a stream, then descends outside the partition where it begins another coating cycle. Cycling is continued in accordance with this invention by causing the coated particles to reenter the coating zone at the lower extremity of the coating partition 42 whereat they intersect additional coating solution and air from distribution plate 40.

The coating solution of the instant invention is comprised of ethyl cellulose, distilled propylene glycol mono-ester and acetylated mono-glycerides.

Ethyl cellulose is the ethyl ether of cellulose in the form of a free-flowing white to light tan powder. It is heat-labile and exposure to high temperatures (240° F.) causes color degradation and loss of properties. It is practically insoluble in water, in glycerine and in propylene glycol but it is soluble in varying proportions in certain organic solvents depending upon the ethoxyl content. Ethyl cellulose containing less than 46–48% of ethoxyl groups is freely soluble in tetrahydrofurane, in methylene acetate, in chloroform and in aeromatic hydrocarbon-alcohol mixtures. Ethyl cellulose containing 46–48% or more of ethoxyl groups is freely soluble in alcohol, in methanol, in toluene and chloroform and in ethyl acetate. Accordingly, ethyl cellulose containing the latter percentage of ethoxyl groups is preferred for use in the instant invention. The preferred ethyl cellulose used herein is available from the Hercules Company as type NF-HG2834.

Distilled propylene glycol mono-ester preferred in the practice of this invention is sold under the trademark "Myverol P-06"(TM) by the Eastman Kodak company. It has a 90% maximum mono-ester content, a 1.2% maximum glycerol content, an iodine value of a maximum of 5%, and an acid value of 4%. Typical properties include a specific gravity at 80° F. of 0.89, a congeal point of 113° F., a clear point of 118° F. and a fatty acid ester proportion of 99% saturated and 1% unsaturated.

Distilled acetylated mono-glycerides preferred for use in this invention are sold under the trademark "Myvacet 7-00"(TM) by the Eastman Kodak Company. The product has a hydroxyl value between 80–96% and a saponification value of 316 to 331. The iodine value is from 0.5 to 3.0. The glycerol content is a maximum of 1.5% and the maximum acid value is 3.0. The product has a Reichert Meissl value of 110 and an acetylation of 68%. The melting range is between 99° F. and 104° F.

The coating materials are prepared for introduction to the drying apparatus by dissolving them in an amount of ethanol effective to provide a flowable solution. Preferably the ratio of ethyl cellulose to distilled propylene glycol mono-ester to distilled acetylated mono-glycerides will be 2:1:1. The amount of solids in the coating solution may vary between 5% and 20% by weight of the total composition and preferably be between 10 and 15% solids by weight of the total composition or solution.

This coating solution is applied to nutrient particles which may include potassium citrate, magnesium phosphate, magnesium oxide, ferrous sulfate, gluconate and thiamine mono-nitrate or thiamine hydrochloride suspended in the above described apparatus. The named nutrients all may be coated by the process of this invention. However, those skilled in the art will recognize that other nutrients may also be encapsulated. The invention will be further described in its preferred embodiment as it relates to the coating of thiamine.

The organic solvent ethanol is intentionally selected in order to facilitate substantially complete removal of solvent from a given batch of coated thiamine particles as the envelopes initially produced have the solvent evaporated prior to the envelope being re-aggregated or agglomerated with other similarly coated thiamine pieces. The apparatus is operated for a length of time sufficient for the coating material to comprise 40% to 60% by weight of the finished product. Preferably it has been found that the most advantageous proportion of coating material to thiamine is 1:1.

The foregoing method of coating thiamine achieves a structurally stable envelope that is substantially free of thiamine, around an agglomerate of thiamine produced by the multiple cycling of the product in the fluidized bed drying apparatus. The effect of repetitive coatings may be called "shingling." Prior art attempts to coat particles such as thiamine encountered difficulties encapsulating such irregularly shaped pieces. Additionally, they would typically apply a relatively thin, hard layer of cellulose derivative material to the product on the order of 2% to 15% by weight of the total composition. In the instant invention, it has been found that the thiamine, when coated with ethyl cellulose distilled propylene glycol mono-ester and acetylated mono-glycerides, produces an encapsulated thiamine product having a soluble film matrix structure which is able to withstand extended storage conditions at temperatures in excess of 100° F. and is also protected in aqueous substances having pH values of below about 4.5. Additionally, the coating, when consumed typically in a beverage system, continues to exist to some degree in the gastrointestinal environment but ultimately substantially all of the thiamine is bio-available.

It is intended that the product of the instant invention will find its best use in fortifying breakfast juice equivalents. Principally, the product will be used in artificial orange juice. However, other artificial breakfast drinks such as grapefruit, grape and tomato juices are contemplated. Additionally, those skilled in the art will recognize that many other beverages, especially those with a pH of below about 4.5, will benefit from the addition of thiamine according to the process of this invention, as well as the addition of encapsulated thiamine to natural juices or beverages which may or may not contain thiamine. The instant invention permits the consumer to enjoy the nutritional benefits of thiamine added to his diet without subjecting him to the characteristic taste and odor of thiamine.

EXAMPLE 1

A coating solution is prepared by dissolving 60 grams of distilled propylene glycol mono-ester which is available under the trademark Myverol P-06(TM) from the Eastman Kodak Company, 60 grams of distilled acetylated mono-glycerides available under the trademark Myvacet 7-00(TM) from the Eastman Kodak Company and 120 grams of ethyl cellulose (7 cps STD Prem) available from the Dow Chemical Company in 2000 milliliters of absolute ethanol. The resultant solution has a solids content of 12% coating material on a weight-/volume basis. The drying apparatus employed is a 6 inch Wurster Truncated Unit. Prior to operating the machine, the following mechanical conditions are set. A No. 3 air distribution plate is put in place. The nozzle employed is a two-fluid ¼ J siphon type available from the Spray Systems Company. A Zenith Pump with a Graham vary drive is set to operate at 0.297 cubic centimeters per revolution. The filter mechanism is set at an air pressure of 25 psig.

Three hundred grams of thiamine mono-nitrate are placed in the coating chamber and the blower is turned on to begin the air flow and the pump is turned on to initiate the application of the coating material. As the air flow fluidizes the thiamine within the coating chamber, the coating solution is contacted with the thiamine.

As the solution and thiamine rise in the chamber, the ethanol evaporates. The partially coated thiamine is recycled back to the coating chamber and is continuously coated for 237 minutes. At the end of this time period, 301.2 grams of coating material encapsulates the thiamine.

Substantially all of the ethanol used in the processing is removed from the product.

The uncoated thiamine particles have an average particle size of 44 microns (325 mesh U.S. standard sieve). The final coated product has a sieve analysis of 10 to 30% plus 20 (U.S. standard mesh), 30 to 90% plus 40 and 100% plus 120.

The encapsulated thiamine is added to a dry beverage mix formulated to resemble natural orange juice which comprises the following ingredients:

| Ingredient | Parts by Weight |
| --- | --- |
| Sucrose | 89.27 |
| Citric Acid | 5.53 |
| Clouding Agent | 2.28 |
| Sodium Carboxymethyl Cellulose (low viscosity) | 0.90 |
| Tricalcium Phosphate | 0.49 |
| Trisodium Citrate | 0.70 |
| Vitamin C | 0.47 |
| Tenfold Orange Oil | 0.26 |
| Vitamin A | 0.04 |
| Color (Mixture of F.D.&C. #5 & F.D.&C. #6 yellow) | 0.01 |
| Encapsulated Thiamine (50% fix) | 0.01 |

The above product was stored in glass jars for a period of 16 weeks at a temprature of 100° F. and a relative humidity of 55%. At the end of each successive 2-week period, a sample of the dry beverage mix was removed from storage and added to water to form an orange flavored beverage with a pH of 3.0. The product was checked for the characteristic off-taste and odor of thiamine prior to hydration and 48 hours afterwards. The first signs of a slight thiamine taste in the beverage appeared after 16 weeks.

EXAMPLE 2

Three hundred grams of potassium citrate are placed in the coating chamber and coated according to the procedure set forth in Example 1.

EXAMPLE 3

Two hundred forty grams of magnesium phosphate are placed in the coating chamber and coated according to the procedure set forth in Example 1.

EXAMPLE 4

A coating solution is prepared by dissolving 60 grams of distilled propylene glycol mono-ester which is available under the trademark Myverol P-06(TM) from the Eastman Kodak Company, 60 grams of distilled acetylated mono-glycerides available under the trademark Myvacet 7-00(TM) from the Eastman Kodak Company and 120 grams of ethyl cellulose (7 cps STD Prem) available from the Dow Chemical Company in 2000 milliliters of absolute ethanol. The resultant solution has a solids content of 12% coating material on a weight-/volume basis. The drying apparatus employed is a 6 inch Wurster Truncated Unit. Prior to operating the machine, the following mechanical conditions are set: A No. 3 air distribution plate is put in place. The nozzle employed is a two-fluid ¼ J siphon type available from the Spray Systems Company. A Zenith Pump with a Graham vary drive is set to operate at 0.297 cc per revolution. The filter mechanism is set at an air pressure of 25 psig. Two hundred forty grams of magnesium oxide are placed in the coating chamber and the blower is turned on to begin the air flow and the pump is turned on to initiate the application of the coating material. As the air flow fluidizes the magnesium oxide within the coating chamber, the coating solution is contacted with the magnesium oxide. As the solution and magnesium oxide rise in the chamber, the ethanol evaporates. The partially coated magnesium oxide is recycled back to the coating chamber and is continuously coated for 410 minutes. At the end of this time period, the product consists essentially of approximately equal parts coating and magnesium oxide. Substantially all of the ethanol used in the processing is removed from the product.

EXAMPLE 5

A coating solution is prepared by dissolving 60 grams of distilled propylene glycol mono-ester which is available under the trademark Myverol P-06(TM) from the Eastman Kodak Company, 60 grams of distilled acetylated mono-glycerides available under the trademark Myvacet 7-00(TM) from the Eastman Kodak Company and 120 grams of ethyl cellulose (7 cps STD Prem) available from the Dow Chemical Company in 2000 milliliters of absolute ethanol. The resultant solution has a solids content of 12% coating material on a weight-/volume basis. The drying apparatus employed is a 6 inch Wurster Truncated Unit. Prior to operating the machine, the following mechanical conditions are set: A No. 3 air distribution plate is put in place. The nozzle employed is a two-fluid ¼ J siphon type available from the Spray Systems Company. A Zenith Pump with a Graham vary drive is set to operate at 0.297 cc per revolution. The filter mechanism is set at an air pressure of 25 psig. Seven hundred grams of ferrous sulfate are placed in the coating chamber and the blower is turned on to begin the air flow and the pump is turned on to initiate the application of the coating material. As the air flow fluidizes the ferrous sulfate within the coating chamber, the coating solution is contacted with the ferrous sulfate. As the solution and ferrous sulfate rise in the chamber, the ethanol evaporates. The partially coated ferrous sulfate is recycled back to the coating chamber and is continuously coated for 770 minutes. At the end of this time period, the product consists essentially of approximately equal parts coating and ferrous sulfate. Substantially all of the ethanol used in the processing is removed from the product.

EXAMPLE 6

A coating solution is prepared by dissolving 60 grams of distilled propylene glycol mono-ester which is available under the trademark Myverol P-06(TM) from the Eastman Kodak Company, 60 grams of distilled acetylated mono-glycerides available under the trademark Myvacet 7-00(TM) from the Eastman Kodak Company and 120 grams of ethyl cellulose type NF-HG2834 available from the Hercules Company in 2000 milliliters of absolute ethanol. The resultant solution has a solids content of 12% coating material on a weight/volume basis. The drying apparatus employed is a 6 inch Wurster Truncated Unit. Prior to operating the machine, the following mechanical conditions are set: A No. 3 air distribution plate is put in place. The nozzle employed is a two-fluid ¼ J siphon type available from the Spray Systems Company. A Zenith Pump with a Graham vary drive is set to operate at 0.297 cc per revolution. The filter mechanism is set at an air pressure of 25 psig. Four hundred grams of copper gluconate are placed in the coating chamber and the blower is turned on to begin the air flow and the pump is turned on to initiate the application of the coating material. As the air flow fluidizes the copper gluconate within the coating chamber, the coating solution is contacted with the copper gluconate. As the solution and copper gluconate rise in the chamber, the ethanol evaporates. The partially coated copper gluconate is recycled back to the coating chamber and is continuously coated for 470 minutes. At the end of this time period, the product consists essentially of equal parts of coating and copper gluconate. Substantially all of the ethanol used in the processing is removed from the product.

We claim:

1. A micro-encapsulated malleable nutrient product which is compatible with food systems and free of offensive odor and taste in aqueous systems comprising a finely divided vitamin or mineral nutrient coated by a matrix comprising a major amount of ethyl cellulose together with propylene glycol mono-ester and acetylated monoglyceride said matrix comprising 4%-60%by weight of the product.

2. The product of claim 1 wherein the nutrient is selected from the group consisting of mineral salts including potassium citrate, magnesium phosphate, magnesium oxide, ferrous sulfate, copper gluconate, and vitamins including ascorbic acid thiamine and thiamine salts.

3. The product of claim 2 wherein the nutrient is thiamine or its salt and the nutrient to coating proportion is about 1:1.

4. A method of micro-encapsulating nutrients which are incompatible or offensive in odor or taste when incorporated in food systems comprising:

a. preparing a solution of matrix material in a halogen-free solvent, said matrix material comprising a major amount of ethyl cellulose together with propylene glycol mono-ester and acetylated monoglyceride;

b. obtaining a finely divided vitamin or mineral nutrient;

c. fluidizing the nutrient in a stream of gas and treating the nutrient with said solution to coat the nutrient with matrix material;

d. sequentially fluidizing and treating the matrix coated nutrient with said solution to aggregate and further coat the nutrient until there is obtained a coated and aggregated nutrient product said product comprising 40-60% by weight of matrix material, said product being malleable and capable of withstanding extended high temperature storage and also protected in aqueous substances having pH values below about 4.5.

5. The method of claim 4 in which the solvent is absolute alcohol.

6. The method of claim 5 wherein the solution contains from 5% to 20% matrix materials by weight of the solution.

7. The method of claim 6 in which the nutrient is selected from the group consisting of mineral salts including potassium citrate, magnesium phosphate, magnesium oxide, ferrous sulfate, copper gluconate, and vitamins including ascorbic acid, thiamine and thiamine salts.

8. The method of claim 7 in which the nutrient is thiamine or its salt.

9. The method of claim 8 in which the nutrient to coating proportion is about 1:1.

* * * * *